Aug. 11, 1931. H. H. GLASIER 1,818,550
TRACTION DEVICE
Filed Dec. 24, 1928 4 Sheets-Sheet 2

INVENTOR.
Harold H. Glasier
BY Nestall and Wallace
ATTORNEYS.

Aug. 11, 1931. H. H. GLASIER 1,818,550
TRACTION DEVICE
Filed Dec. 24, 1928 4 Sheets-Sheet 3
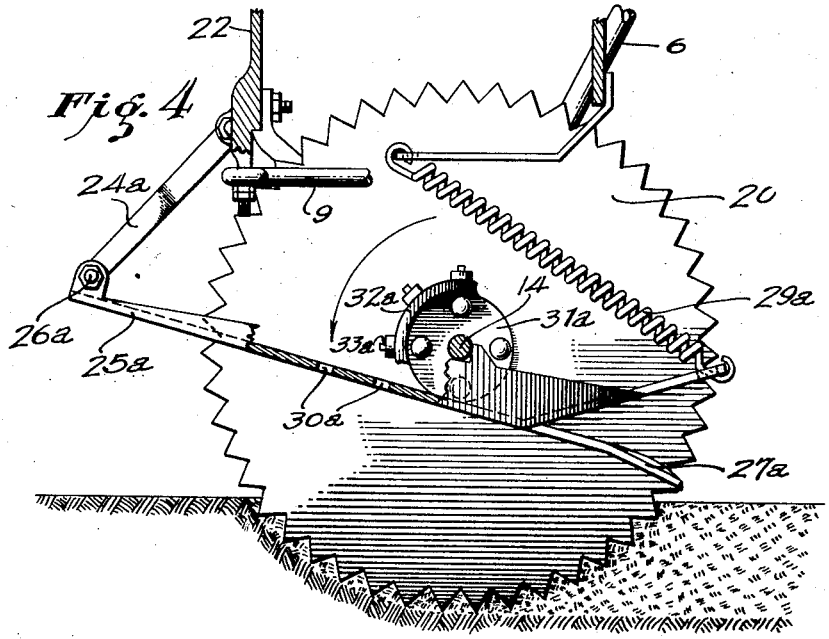
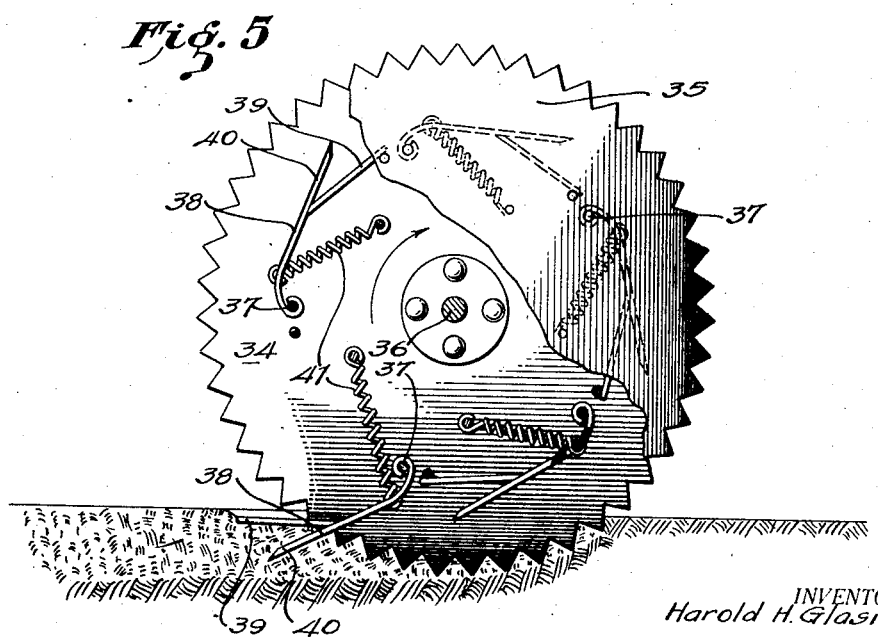
INVENTOR.
Harold H. Glasier
BY
ATTORNEYS.

Aug. 11, 1931.  H. H. GLASIER  1,818,550
TRACTION DEVICE
Filed Dec. 24, 1928  4 Sheets-Sheet 4
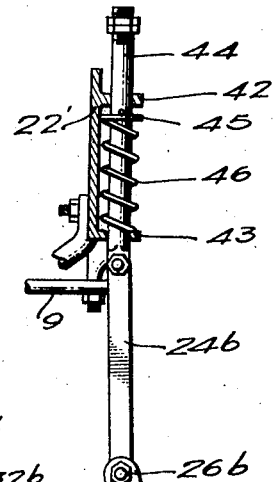
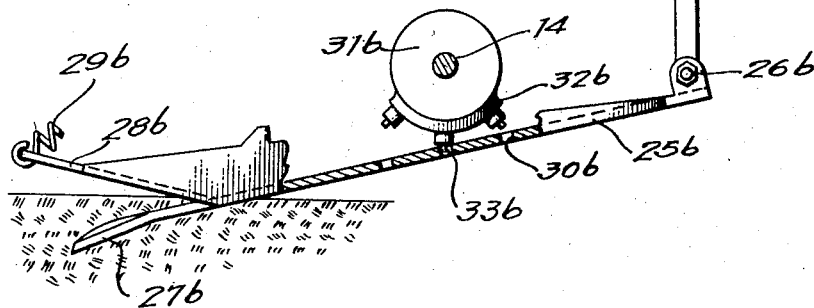
Fig. 6
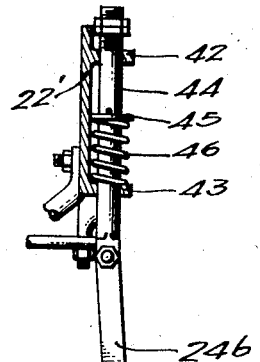
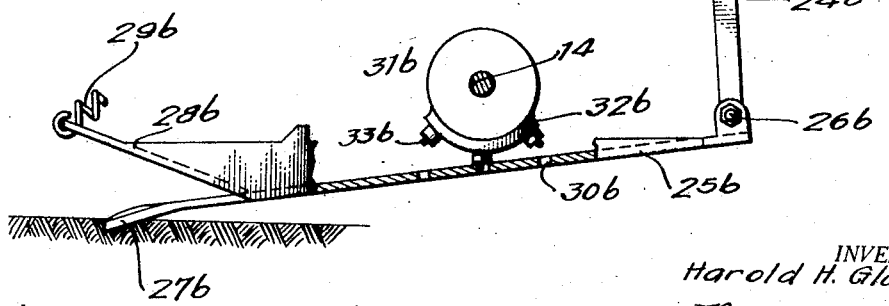
Fig. 7
INVENTOR.
Harold H. Glasier
BY Nestall and Wallace
ATTORNEYS.

Patented Aug. 11, 1931

1,818,550

UNITED STATES PATENT OFFICE

HAROLD H. GLASIER, OF LOS ANGELES, CALIFORNIA

TRACTION DEVICE

Application filed December 24, 1928. Serial No. 328,235.

This invention relates to a traction device which is especially adapted for propulsion of a body over soft ground, and is especially useful with agricultural machines and instruments. Traction wheels are subject to slippage and lose their tractive effort. It has been attempted to remedy this fault by the addition of lugs, shoes, pallets and the like which either offer a flat supporting surface or penetrate the ground. The present invention contemplates the provision of propellers which are moved and swung to engage the ground, penetrate the latter and exert a backward push, and then are retracted from the ground.

The objects of this invention are first, to provide propelling means which comprises a plurality of propeller limbs acting one after another to engage the ground and progressively push the body to be propelled in a forward direction; second, to provide a propeller limb of the character described which on retraction will break the ground; third, to provide a specific type of propeller mechanism in which plurality of propeller limbs are alternately reciprocated; and fourth, to provide propellers in the form of jointed limbs.

These objects together with other objects and corresponding accomplishments are obtained by means of the embodiments of my invention illustrated in the accompanying drawings, in which:—

Figure 1:
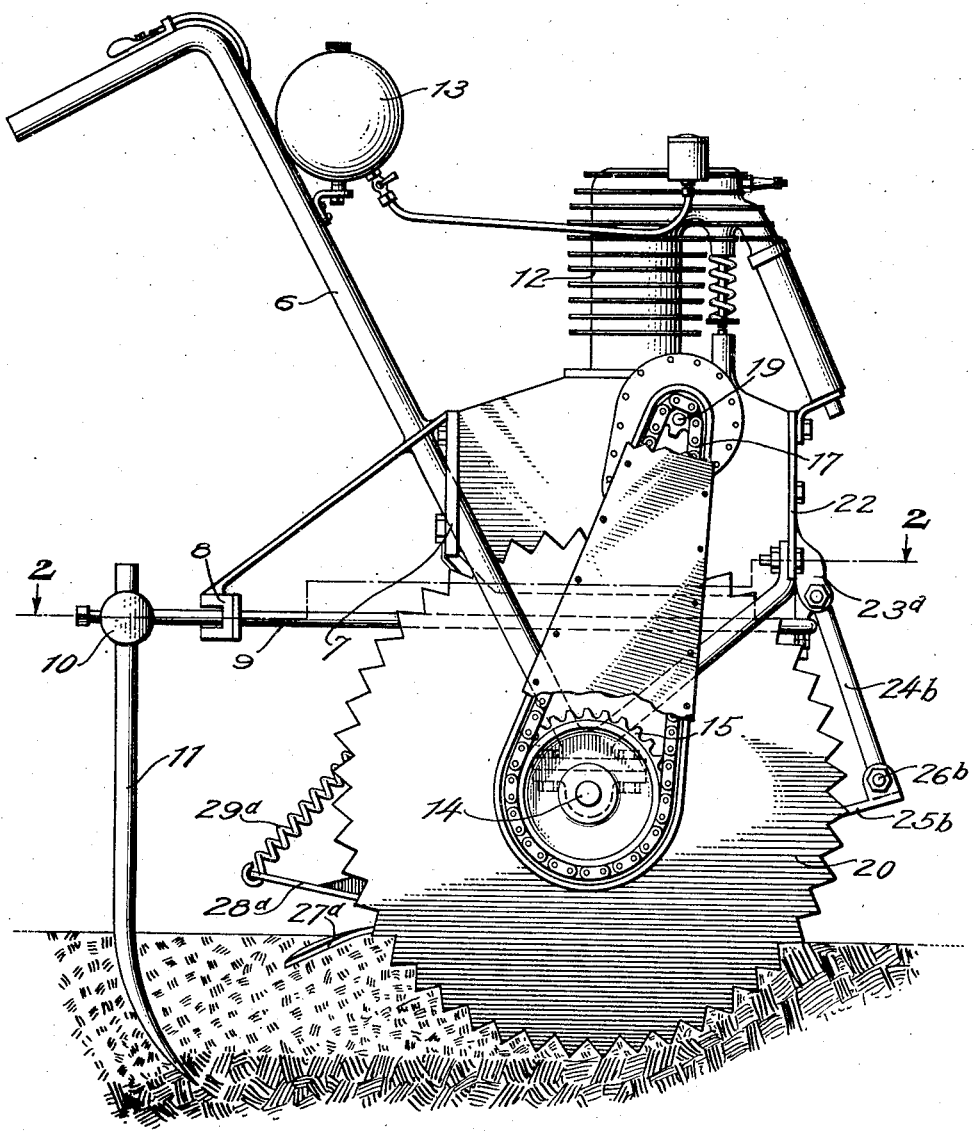
Figure 2:
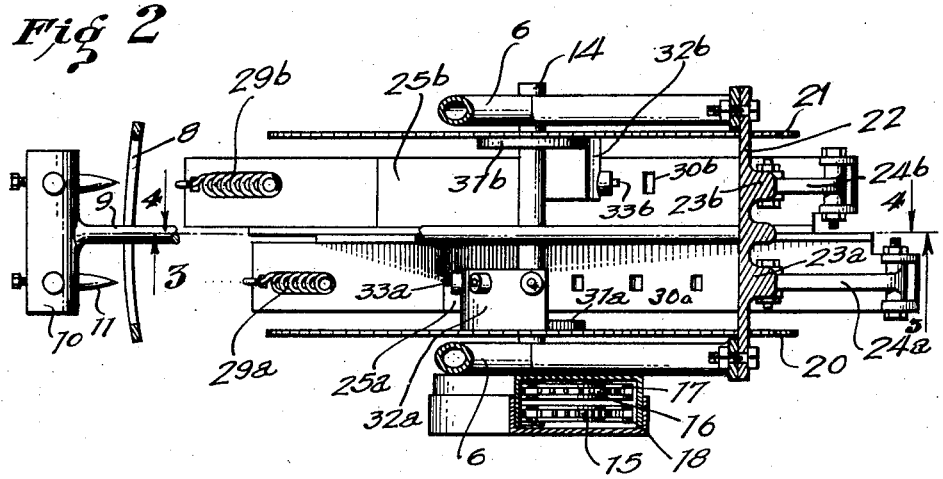
Figure 3:
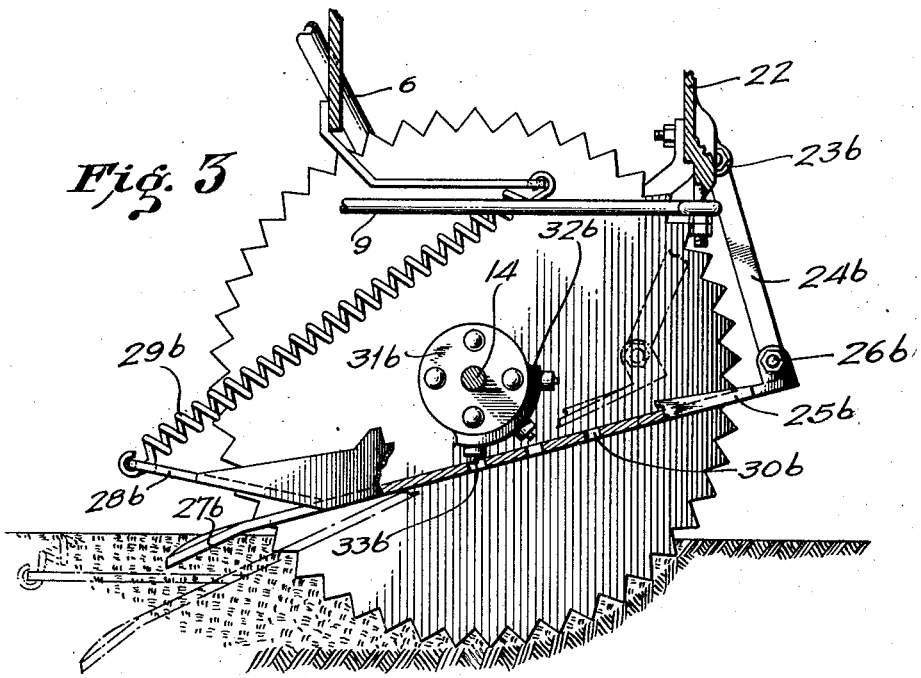

Fig. 1 is a side elevation of a complete implement having a ground working tool hitched thereto, portions being broken away; Fig. 2 is a plan view; Fig. 3 is a section as seen on the line 3—3 looking in the direction of the appended arrows; Fig. 4 is a section as seen on the line 4—4 looking in the opposite direction to the arrows; Fig. 5 is a side elevation of another form of my invention; and Figs. 6 and 7 are side elevations of a modification of the limb mounting.

Referring with more particularity to the drawings and especially to Figs. 1 to 4 inclusive, a cultivator is shown especially adapted for gardens and small farm work, it being power driven. It is adapted to be guided by an operator who walks behind the implement. A set of handle bars 6 is shown supporting a frame 7. The frame carries an arched guide 8 at the rear which is slotted for the passage of a draw bar 9 pivotally secured to the front of the frame. At the end of the draw bar is a cross or attachment bar 10 to which cultivator teeth 11 are secured. Mounted upon the frame 7 is a gas engine 12, supplied with fuel from a tank 13 mounted on the handle bars. Journalled at the lower ends of the handle bars is an axle 14. Sprocket wheels 15 and 16 are secured to the axle and are driven by sprocket chains 17 and 18 which pass over sprocket pinions mounted on an engine drive shaft 19. Fixed to the axle are ground cutter wheels 20 and 21. These wheels are of similar construction and are for the purpose of cutting or incising the ground. They are preferably toothed on their peripheries. The details of the structure before described, are not pertinent to the present invention and are shown merely for illustrative purposes. It is essential to the present invention that the axle 14 be driven from a source of power. It will be noted from the description of the invention as it proceeds, that the ground disks support the axle in spaced relation to the ground and this is their only function so far as the present invention is concerned.

Extending across the front of the frame is a plate 22 having lugs 23a and 23b to which are secured upper joints 24a and 24b of limbs. To joint 24a a lower joint 25a is secured by a pivotal connection 26a forming a knee. Similarly upper joint 24b has a lower joint 25b secured thereto at a knee 26b. The joints 25a and 25b are preferably of angle form having legs slidably in contact with one another on their contiguous sides so as to aid in guiding the joints. Each lower joint has at its end a foot with toes 27a and 27b. Heels 28a and 28b are also provided. Secured to heels 28a and 28b fastened at their upper ends to the frame are springs 29a and 29b tending to double the limbs formed by the upper and lower joints. Each lower joint has sets of cog holes 30a and 30b for reception of cam cogs.

Mounted upon shaft 14 so as to be rotated therewith are cam cog wheels comprising disks 31a and 31b. Extending from the disks are segments of cylindrical surfaces 32a and 32b. The cylindrical surfaces are disposed at diametrically opposite positions. Each surface has a set of cogs marked 33a and 33b for engagement in the cog holes 30a and 30b respectively.

Upon rotation of the shaft 14, cog pins 33a engage the cog holes 30a and push the lower joint toward the rear tending to straighten the limb. After the cylindrical portion 32a has passed out of registration with the lower joint of the limb, the spring 29a lifts the lower joint tending to double the limb, the joint resting against the inner side of the cylindrical portion. Thus, a cam action is secured.

The propelling limbs operate alternately. Considering one limb in doubled or retracted position, it rests against the inner side of the cylindrical cog surface, and is gradually forced downwardly, the cog pins when in lower position engaging in the cog holes and moving the lower joint toward the rear to exert a push. The foot will have been projected into the ground at the initial portion of the movement so as to obtain a firm hold. As the lower joint is pushed toward the rear, it finally reaches a rearward position where it is released from the cogs and thereupon its spring lifts it from the ground and pulls it toward the front in position for another propelling movement. A digging action is caused by lifting of the foot which breaks up the ground and aids in the action of the ground tools.

In Fig. 5 a construction is shown wherein spaced ground disks 34 and 35 are mounted upon a shaft 36 corresponding to shaft 14. Adjacent the periphery of the disk are pins 37 connecting the disks and upon which are mounted joints 38, each joint having a heel 39 and a toe 40. Tension springs 41 tend to hold the joints in inner position. The disks correspond to an upper joint for each joint 38, the knees being the pins 37 and the lower joints being marked 38. Instead of the action being of a reciprocatory nature, the joints 38 move continuously in one direction and are moved downwardly until they strike and penetrate the ground and then are pushed toward the rear, finally being lifted as indicated in the drawings.

It will be noted that as the propelling effort is downward and toward the rear, a heavy weight is not necessary to obtain an effective ground grip. Thus, the propelling mechanism is adapted for light weight implements. Furthermore as the propelling effort is exerted to the rear of the ground wheel point of contact with the ground, the tendency to turn the implement rearwardly about the ground wheel axle is lessened.

Referring particularly to Figs. 6 and 7, a limb and mounting is shown for incorporation in the structure shown in Figs. 1 to 4. The difference resides in the connection of the legs to the frame. A plate 22' corresponding to plate 22 has spaced flanges 42 and 43. Aligned bores in the flanges slidably receive stems, one being indicated by 44. The upper joints of the legs are pivotally secured to the stems. Each stem has a washer 45 held against upward displacement by a pin. Between washer 45 and flange 43 is a compression spring 46 tending to elevate the stem. On soft ground the toe digs into the ground to a greater depth as shown in Fig. 6 and the lower joint has a greater angle to the ground surface than when engaged with hard ground as shown in Fig. 7. Thus, the most effective push on the ground is obtained, springs 46 accommodating the limbs to the character of the ground.

What I claim is:—

1. A traction device comprising a body to be moved along the ground, a limb pivotally supported on the body, a jointed knee in said limb, a gripping foot on said limb for penetrating the ground, a continuously rotative member having a segmental portion to intermittently engage said limb and move the latter downwardly and rearwardly.

2. A traction device comprising a body to be moved along the ground, a limb pivotally supported on the body, a jointed knee in said limb, a gripping foot on said limb for penetrating the ground, a continuously rotative member having a segmental portion to intermittently engage said limb and move the latter downwardly and rearwardly, and ground wheels for supporting said body on the ground.

3. A traction device comprising a body to be moved along the ground, a limb pivotally supported on the body, jointed knee in said limb, a gripping foot on said limb for penetrating the ground, a continuously rotative member for directly acting upon and intermittently swinging said limb downwardly and rearwardly toward straightening position, said limb being maintained crooked at its knee, said rotative member and limb having cog gearing means disposed over a segment of said rotative member whereby to alternatively move said limb toward straightening position and then to release the same.

4. A traction device comprising a body to be moved along the ground, a limb pivotally secured on the body, a jointed knee in said limb, a gripping foot on said limb for penetrating the ground, a continuously rotative member for directly acting upon and intermittently swinging said limb downwardly and rearwardly toward straightening position, said limb being maintained crooked at its knee, said rotative member and limb having cog gearing means disposed over a segment of said member whereby to alternately move said limb toward straightening position and then to release the same, and ground wheels for supporting said body on the ground.

5. A traction device comprising a body to be moved along the ground, a limb pivotally secured on the body, a jointed knee in said limb, a gripping foot on the lower joint of said limb for penetrating the ground, means acting as a cam to support said limb at its lower joint and alternately move it downward and enable upward movement, and means for moving said lower joint rearwardly when in downward position.

6. A traction device comprising a body to be moved along the ground, a limb pivotally secured on the body, a jointed knee in said limb, a gripping foot on the lower joint of said limb for penetrating the ground, means acting as a cam to support said limb, alternately move it downward and enable upward movement, means moving said limb rearwardly when in downward position, and ground wheels for supporting said body on the ground.

7. A traction device comprising a body to be moved along the ground, a limb pivotally secured on the body, a jointed knee in said limb, a gripping foot on the lower joint of said limb for penetrating the ground, means acting as a cam to support said limb and alternately move it downward and enable upward movement, means moving said limb rearwardly when in downward position, and spring means tending to return said limb to upper position.

8. A traction device comprising a body to be moved along the ground, a limb pivotally supported on the body, a jointed knee in said limb, a gripping foot on the lower joint of said limb for penetrating the ground, means acting as a cam to support said limb and alternately move it downward and enable upward movement, means moving said limb rearwardly when in downward position, spring means tending to return said limb to upper position, and ground wheels for supporting said body on the ground.

9. A traction device comprising a body to be moved along the ground, a limb pivotally supported on the body, a jointed knee in said limb, a gripping foot on the lower joint of said limb for penetrating the ground, a segmental cog wheel rotatably mounted, said limb having holes for engagement by the cogs on said wheel whereby to intermittently swing said limb downwardly and rearwardly toward straightening position, said limb being maintained crooked at its knee.

10. A traction device comprising a body to be moved along the ground, a limb pivotally supported on the body, a jointed knee in said limb, a gripping foot on the lower joint of said limb for penetrating the ground, a segmental cog wheel rotatably mounted, said limb having holes for the cogs of said wheel whereby to intermittently swing said limb downwardly and rearwardly toward straightening position, said limb being maintained crooked at its knee, and ground wheels for supporting said body on the ground.

11. A traction device comprising a body to be moved along the ground, a limb pivotally supported on the body, a jointed knee in said limb, a gripping foot on the lower joint of said limb for penetrating the ground, a segmental cog wheel rotatably mounted, said lower joint having holes for the cogs on said wheel whereby to intermittently swing said limb downwardly and rearwardly toward straightening position, said limb being maintained crooked at its knee, and spring means tending to retain said lower joint in its upper position.

12. A traction device comprising a body to be moved along the ground, a limb pivotally supported on said body, a jointed knee in said limb, a gripping foot on the lower joint of said limb for penetrating the ground, a segmental cog wheel rotatably mounted, said lower joint having holes for the cogs on said wheel whereby to intermittently swing said limb downwardly and rearwardly toward straightening position, said limb being maintained crooked at its knee, spring means tending to retain said lower joint in its upper position, and ground wheels for supporting said body on the ground.

In witness that I claim the foregoing I have hereunto subscribed my name this 22nd day of November, 1928.

HAROLD H. GLASIER.